US012586520B2

(12) United States Patent
Park et al.

(10) Patent No.: US 12,586,520 B2
(45) Date of Patent: Mar. 24, 2026

(54) PIXEL CIRCUIT AND DISPLAY DEVICE INCLUDING THE SAME

(71) Applicant: Samsung Display Co., LTD., Yongin-si (KR)

(72) Inventors: Jun Hyun Park, Yongin-si (KR); Cheol-Gon Lee, Yongin-si (KR); Mu Kyung Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/171,677

(22) Filed: Apr. 7, 2025

(65) Prior Publication Data

US 2026/0065841 A1 Mar. 5, 2026

(30) Foreign Application Priority Data

Aug. 29, 2024 (KR) ........................ 10-2024-0117151

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2310/0275* (2013.01); *G09G 2310/08* (2013.01); *G09G 2320/0247* (2013.01)

(58) Field of Classification Search
CPC ............. G09G 3/32; G09G 2300/0819; G09G 2310/0267; G09G 2310/0275; G09G 2310/08; G09G 2320/0247
See application file for complete search history.

(56) References Cited

U.S. PATENT DOCUMENTS

| | | | | |
|---|---|---|---|---|
| 11,804,171 | B2 | 10/2023 | Park et al. | |
| 2021/0264857 | A1* | 8/2021 | Wang | G09G 3/3258 |
| 2022/0358881 | A1* | 11/2022 | Chae | G09G 3/3266 |
| 2023/0317004 | A1* | 10/2023 | Choi | G09G 3/3233 345/206 |

(Continued)

FOREIGN PATENT DOCUMENTS

| | | |
|---|---|---|
| KR | 1020230044091 A | 4/2023 |
| KR | 1020230098997 A | 7/2023 |

(Continued)

*Primary Examiner* — Andrew Sasinowski
(74) *Attorney, Agent, or Firm* — CANTOR COLBURN LLP

(57) ABSTRACT

A pixel circuit includes a light emitting element; a first transistor connected between a first node and the light emitting element, and including a control terminal connected to a second node; a second transistor connected between a corresponding data line among data lines and the first node, and including a control terminal connected to a first scan signal line among scan signal lines; a third transistor connected between the second node and a first initialization voltage line, and including a control terminal connected to a first initialization signal line among initialization signal lines; and a fourth transistor connected between the first node and a bias voltage line, and including a control terminal connected to a second initialization signal line among the initialization signal lines. The second initialization signal line is connected to a control terminal of a transistor of another pixel circuit and connected to the first initialization voltage line.

20 Claims, 15 Drawing Sheets

(56) References Cited

U.S. PATENT DOCUMENTS

| | | | | |
|---|---|---|---|---|
| 2024/0111381 | A1* | 4/2024 | Song | G06V 40/1318 |
| 2024/0169901 | A1* | 5/2024 | Park | G09G 3/32 |
| 2024/0257733 | A1* | 8/2024 | Huang | G09G 3/3233 |
| 2024/0257739 | A1* | 8/2024 | Noh | G09G 3/3233 |
| 2024/0304144 | A1* | 9/2024 | Sano | G09G 3/3291 |
| 2024/0353951 | A1* | 10/2024 | Song | G06F 3/04164 |
| 2024/0363056 | A1* | 10/2024 | Park | G09G 3/3233 |

FOREIGN PATENT DOCUMENTS

| | | | |
|---|---|---|---|
| KR | 1020230116991 | A | 8/2023 |
| KR | 1020230139915 | A | 10/2023 |

* cited by examiner

PIXEL CIRCUIT AND DISPLAY DEVICE INCLUDING THE SAME

This application claims priority to Korean Patent Application No. 10-2024-0117151, filed on Aug. 29, 2024, and all the benefits accruing therefrom under 35 U.S.C. § 119, the content of which in its entirety is herein incorporated by reference.

BACKGROUND

(a) Field

Embodiments of the disclosure relate to a pixel circuit and a display device including the pixel circuit.

(b) Description of the Related Art

A display device displays an image based on input image data received from a host processor (e.g., a graphics processing unit or graphics card). A rendering frequency of the host processor providing the input image data may not match an operating frequency of the display device. Such a frequency mismatch may cause tearing, which is a boundary visible in the image displayed on the display device. To prevent tearing, the display device may operate in a variable frequency mode to synchronize the rendering frequency of the host processor and the operating frequency of the display device.

SUMMARY

In a display device that operates in a variable frequency mode, the luminance of a display panel thereof may change due to changes in the frame frequency, and the change in the luminance of the display panel may cause a flicker phenomenon.

Embodiments are intended to provide a pixel circuit that can prevent flicker phenomenon in a display device operating in a variable frequency mode while increasing integration of a display panel, and a display device including the same.

A pixel circuit of a display panel including a plurality of pixel circuits according to an embodiment includes: a light emitting element; a first transistor connected between a first node and the light emitting element, and including a control terminal connected to a second node; a second transistor connected between a corresponding data line among a plurality of data lines and the first node, and including a control terminal connected to a first scan signal line among a plurality of scan signal lines connected to the plurality of pixel circuits; a third transistor connected between the second node and a first initialization voltage line which transmits a first initialization voltage, and including a control terminal connected to a first initialization signal line among a plurality of initialization signal lines connected to the plurality of pixel circuits; and a fourth transistor connected between the first node and a bias voltage line which transmits a bias voltage, and including a control terminal connected to a second initialization signal line, which is different from the first initialization signal line, among the plurality of initialization signal lines. In such an embodiment, the second initialization signal line is connected to a control terminal of a transistor of another pixel circuit and connected to the first initialization voltage line.

In an embodiment, the another pixel circuit may be connected to a second scan signal line, which is different from the first scan signal line, among the plurality of scan signal lines.

In an embodiment, the pixel circuit may further include: a fifth transistor connected between the second node and the third transistor, and including a control terminal connected to a corresponding compensation signal line among a plurality of compensation signal lines connected to the plurality of pixel circuits; and a sixth transistor connected between the first transistor and the third transistor, and including a control terminal connected to the corresponding compensation signal line.

In an embodiment, the pixel circuit may further include a seventh transistor connected between the fifth transistor and the third transistor, and including a control terminal connected to the corresponding compensation signal line. In such an embodiment, the sixth transistor may be connected to a node between the fifth transistor and the seventh transistor.

In an embodiment, the pixel circuit may further include a seventh transistor connected between the fifth transistor and the third transistor, and including a control terminal connected to the corresponding compensation signal line. In such an embodiment, the sixth transistor may be connected to a node between the third transistor and the seventh transistor.

In an embodiment, in one frame period among a plurality of frame periods, during which one image is displayed, the fifth transistor and the sixth transistor may be turned on, and in the remaining frame periods among the plurality of frame periods, the fifth transistor and the sixth transistor may be in a turned-off state.

In an embodiment, the pixel circuit may further include: a fifth transistor connected between the second node and the third transistor, and including a control terminal connected to a corresponding first compensation signal line among a plurality of first compensation signal lines connected to the plurality of pixel circuits; and a sixth compensation transistor connected between the first transistor and third transistor, and including a control terminal connected to a corresponding second compensation signal line among a plurality of second compensation signal lines connected to the plurality of pixel circuits. In such an embodiment, the fifth transistor may be an N-type transistor, and the sixth transistor may be a P-type transistor. In such an embodiment, levels of signals applied to the corresponding first compensation signal line and the corresponding second compensation signal line are opposite to each other.

In an embodiment, the first to fourth transistors may be P-type transistors.

In an embodiment, the pixel circuit may further include a fifth transistor connected between a first terminal of the light emitting element and a second initialization voltage line which transmits a second initialization voltage and including a control terminal connected to the second initialization signal line.

In an embodiment, the pixel circuit may further include a hold capacitor connected between a first power line which transmits a first power voltage and the first node.

In an embodiment, the pixel circuit may further include a fifth transistor connected between the second node and the fourth transistor and including a control terminal connected to the first initialization signal line.

In an embodiment, the pixel circuit may further include: a fifth transistor connected between a first power line which transmits a first power voltage and the first node, and including a control terminal connected to a corresponding light-emission control line among a plurality of light-emission control lines; and a sixth transistor connected between the first transistor and the light emitting element, and including a control terminal connected to the corresponding light-emission control line.

A display device according to an embodiment includes: a display panel including a plurality of pixels connected to a plurality of scan signal lines, a plurality of initialization lines, and a plurality of data lines; a scan driver connected to the plurality of scan signal lines, where the scan driver provides a plurality of scan signals to the plurality of pixels; an initialization driver connected to the plurality of initialization signal lines, where the initialization driver provides a plurality of initialization signals to the plurality of pixels; and a data driver connected to the plurality of data lines, where the data driver provides a plurality of data signals to the plurality of pixels. In such an embodiment, a first pixel of the plurality of pixels includes: a light emitting element; a first transistor connected between a first node and the light emitting element and including a control terminal connected to a second node; a second transistor connected between a corresponding data line among the plurality of data lines and the first node, and including a control terminal connected to a first scan signal line among the plurality of scan signal lines; a third transistor connected between the second node and a first initialization voltage line which transmits a first initialization voltage, and including a control terminal connected to a first initialization signal line among the plurality of initialization signal lines; and a fourth transistor connected between the first node and a bias voltage line which transmits a bias voltage, and including a control terminal connected to a second initialization signal line, which is different from the first initialization signal line, among the plurality of initialization signal lines. In such an embodiment, the second initialization signal line is connected to a control terminal of a transistor of a second pixel and connected to the first initialization voltage line. In such an embodiment, the second pixel is connected to a second scan signal line, which is different from the first scan signal line, among the plurality of scan signal lines.

In an embodiment, the first pixel may further include: a fifth transistor connected between the second node and the third transistor, and including a control terminal connected to a corresponding compensation signal line among a plurality of compensation signal lines; and a sixth transistor connected between the first transistor and the third transistor, and including a control terminal connected to the corresponding compensation signal line.

In an embodiment, in one frame period among a plurality of frame periods, during which one image is displayed, the fifth transistor and the sixth transistor may be turned on, and in the remaining frame periods among the plurality of frame periods, the fifth transistor and the sixth transistor are in a turned-off state.

In an embodiment, the first pixel may further include a fifth transistor connected between a first terminal of the light emitting element and a second initialization voltage line which transmits a second initialization voltage and including a control terminal connected to the second initialization signal line.

In an embodiment, the first pixel may further include: a fifth transistor connected between a first power line which transmits a first power voltage and the first node, and including a control terminal connected to a corresponding light-emission control line among a plurality of light-emission control lines connected to the plurality of pixels; and a sixth transistor connected between the first transistor and the light emitting element, and including a control terminal connected to the corresponding light-emission control line.

According to embodiments of the disclosure, flicker phenomenon in the display device operating in the variable frequency mode may be effectively prevented while increasing the integration of the display panel.

DETAILED DESCRIPTION

Figure 1:
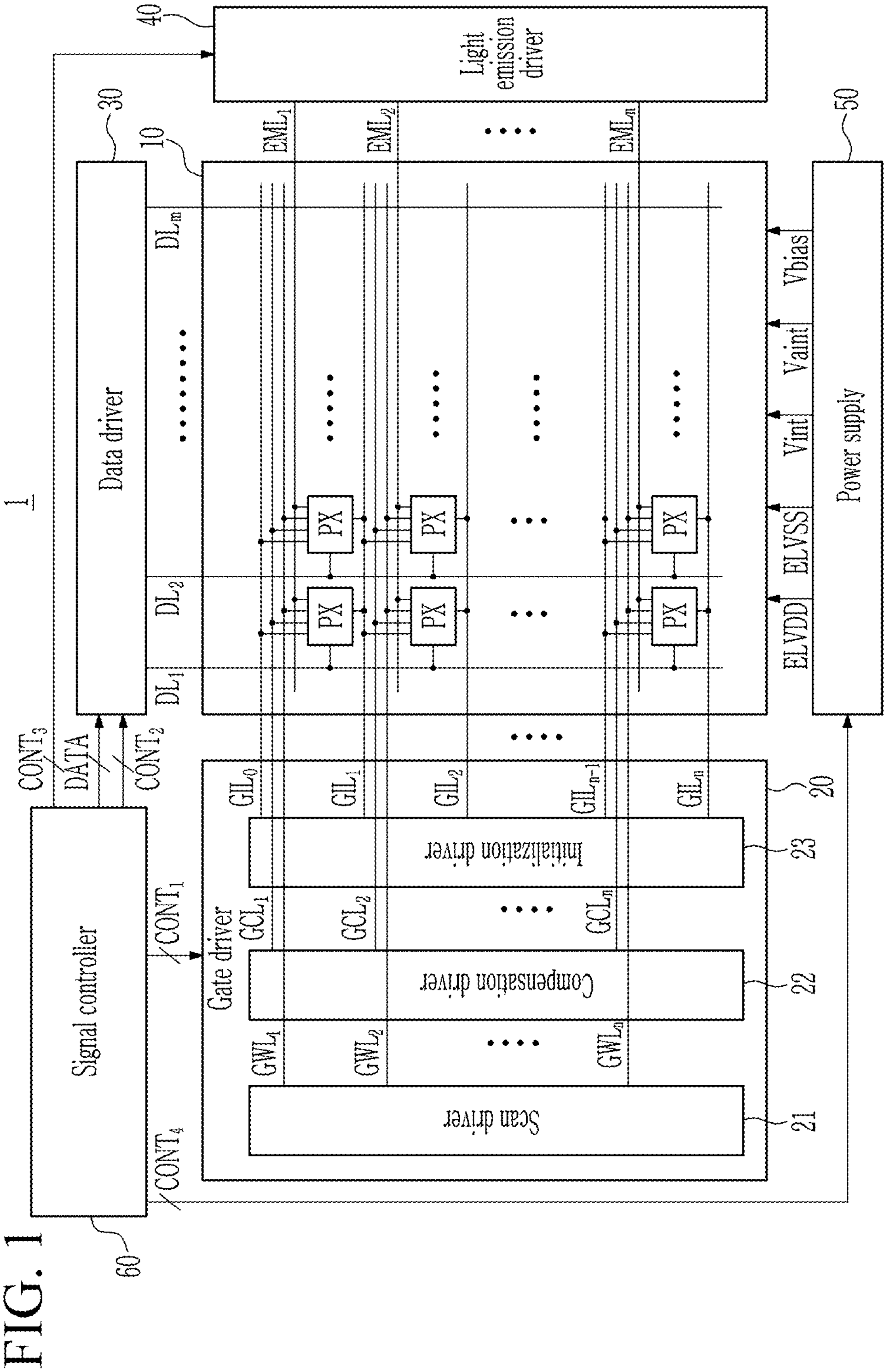
FIG. 1 is a block diagram schematically illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly explain the disclosure, parts that are not related to the description are omitted, and the same reference symbols are used for identical or similar components throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

In addition, the size and thickness of each component shown in the drawing are arbitrarily illustrated for better understanding and ease of description, and the disclosure is not necessarily limited to what is illustrated. In drawings, the thickness may be enlarged to clearly express multiple layers and regions. In addition, for better understanding and ease of description, the thickness of some layers and regions may be exaggerated.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram schematically illustrating a display device according to an embodiment.

Referring to FIG. 1, a display device 1 according to an embodiment may include a display panel 10, a gate driver 20, a data driver 30, a light emission driver 40, a power supply 50, and a signal controller 60.

The display panel 10 may include a plurality of pixels PX and a plurality of signal line for applying an electrical signal to the plurality of pixels PX.

The signal lines for applying the electrical signal to the plurality of pixels PX may include a plurality of gate signal lines $GWL_1$ to $GWL_n$, $GCL_1$ to $GCL_n$, and $GIL_0$ to $GIL_n$ and a plurality of light-emission control signal lines $EML_1$ to $EML_n$ extending in a first direction (the horizontal direction/row direction in FIG. 1), and a plurality of data signal lines $DL_1$ to $DL_m$ extending in a second direction (the vertical direction/column direction in FIG. 1). Here, n and m are natural numbers greater than 1. The plurality of gate signal lines $GWL_1$ to $GWL_n$, $GCL_1$ to $GCL_n$, and $GIL_0$ to $GIL_n$ may be arranged apart from each other along the second direction, and may transmit a gate signal to pixels PX. The plurality of data signal line $DL_1$ to $DL_m$ may be arranged apart from each other along the second direction, and may transmit a data signal to pixels PX.

The plurality of pixels PX may be repeatedly arranged in the first direction and the second direction. The plurality of pixels PX may be arranged in various forms, such as stripe arrangement, penta-line arrangement, and mosaic arrangement. The plurality of pixels PX may be connected to corresponding gate signal lines among the plurality of gate signal lines $GWL_1$ to $GWL_n$, $GCL_1$ to $GCL_n$, and $GIL_0$ to $GIL_n$, corresponding light-emission control signal line among the plurality of light-emission control signal lines $EML_1$ to $EML_n$, and corresponding data signal lines among the plurality of data signal lines $DL_1$ to $DL_m$, respectively. In an embodiment, although not illustrated in the display panel 10 of FIG. 1, each of the plurality of pixels PX may be connected with a power supply line and supplied with a first power source voltage ELVDD, a second power source voltage ELVSS, a first initialization voltage Vint, a second initialization voltage Vaint, a bias voltage Vbias, or the like.

In an embodiment, each of the plurality of pixels PX may include an organic light emitting diode (OLED) as a light emitting element (or display element). Each organic light emitting diode may be supplied with a driving current corresponding to the data signal transmitted through the corresponding data signal line. Each organic light emitting diode may emit light of a certain luminance corresponding to the driving current supplied thereto to create an image.

The gate driver 20 may be connected with a plurality of gate signal lines. The gate driver 20 may generate gate signals based on a first control signal $CONT_1$ received from the signal controller 60. The gate driver 20 may sequentially supply the generated gate signals to each pixel PX through the gate signal lines. Each gate signal line may be connected to a gate of a transistor in the corresponding pixel PX. A gate signal may have an on voltage level that can turn on a transistor connected to a corresponding gate signal line, and an off voltage level that can turn off the transistor. The on voltage may be a high level voltage, and the off voltage may be a low level voltage. Alternatively, the one voltage may be a low level voltage, and the off voltage may be a high level voltage. A period during which the on voltage of each gate signal is maintained and a period during which the off voltage is maintained may differ depending on the operation performed by the transistor receiving the gate signal within each pixel PX of the display panel 10.

The plurality of gate signal lines may include a plurality of scan signal lines $GWL_1$ to $GWL_n$, a plurality of compensation signal lines $GCL_1$ to $GCL_n$, and a plurality of initialization signal lines $GIL_0$ to $GIL_n$. The gate signal supplied to each pixel PX by the gate driver 20 may include a scan signal, a compensation signal, and an initialization signal. The gate driver 20 may include a scan driver 21 that supplies a scan signal to each pixel PX, a compensation driver 22 that supplies a compensation signal to each pixel PX, and an initialization driver 23 that supplies an initialization signal to each pixel PX. The scan driver 21 may be connected to a plurality of scan signal lines $GWL_1$ to $GWL_n$ and may output a plurality of scan signals to the plurality of scan signal lines $GWL_1$ to $GWL_n$. The compensation driver 22 may be connected to the plurality of compensation signal lines $GCL_1$ to $GCL_n$, and may output the plurality of compensation signals to the plurality of compensation signal lines $GCL_1$ to $GCL_m$. The initialization driver 23 may be connected to the plurality of initialization signal lines $GIL_0$ to $GIL_n$, and may output the plurality of initialization signal to the plurality of initialization signal lines $GIL_0$ to $GIL_n$.

The scan driver 21, the compensation driver 22, and the initialization driver 23 may each include a plurality of stages at which corresponding gate signals are sequentially generated and output. In an embodiment, for example, the scan driver 21 may include a plurality of stages at which corresponding scan signals are sequentially generated and output, the compensation driver 22 may include a plurality of stages at which corresponding compensation signals are sequentially generated and output, and the initialization driver 23 may include a plurality of stages at which corresponding initialization signals are sequentially generated and output.

The plurality of stages included in each of the scan driver 21, the compensation driver 22, and the initialization driver 23 may be connected to each other in a dependent manner (e.g., a cascade manner). In an embodiment, for example, a stage connected to a scan signal line $GWL_1$ among the plurality of stages included in the scan driver 21 may be connected to a next stage connected to a scan signal line $GWL_2$. Among the plurality of stages included in each of the scan driver 21, the compensation driver 22, and the initialization driver 23, the first stage is started to operate by a vertical start signal transmitted from the signal controller 60, and the stages after the second are started to operate by the output of a previous stage such that the stages can operate in a sequential operation manner. When each stage starts driving, a gate signal may be output to a corresponding gate signal line.

In some embodiments, the display device 1 may operate in a variable frequency mode. In the variable frequency mode, the display device 1 may display an image based on one image data over a plurality of frame periods. During at least one frame period during which the display device 1 operates in the variable frequency mode, the compensation driver 22 may stop generating the plurality of compensation signals.

The gate driver 20 may be implemented (or integrally formed) on a same substrate as the display panel 10.

The data driver 30 may be connected to the plurality of data signal lines $DL_1$ to $DL_m$. The data driver 30 may receive the image data signal DATA having gray (including grayscale information) from the signal controller 60. The data driver 30 converts the received image data signal DATA into a voltage or current format to generate a data signal (or a data voltage), and may generate a data signal corresponding to each pixel PX. The data driver 30 may generate a data signal based on a second control signal $CONT_2$ received from the signal controller 60. The data driver 30 may supply the generated data signal to each pixel PX through the data signal lines $DL_1$ to $DL_m$. When supplying a data signal, the data driver 30 may supply a data signal to each pixel PX in synchronization with the gate signal output from the gate driver 20.

The light emission driver 40 may be connected to the plurality of light-emission control signal lines $EML_1$ to $EML_n$. The light emission driver 40 may generate a light emission control signal based on a third control signal $CONT_3$ received from the signal controller 60. The light emission driver 40 may supply the generated light-emission control signal to each pixel through the plurality of light-emission control signal lines $EML_1$ to $EML_n$. The light-emission control signal may be transmitted to the light-emission control transistor of each pixel PX through the corresponding light-emission control signal line. The transistor for light-emission control may control light emission of the light-emitting element of the corresponding pixel PX in response to the transmitted light-emission control signal. The light-emitting element may or may not emit light with luminance corresponding to the data signal based on the control of the transistor for light-emission control.

The power supply 50 may supply a first power source voltage ELVDD, a second power source voltage ELVSS, a first initialization voltage Vint, an anode initialization voltage Vain, a bias voltage Vbias, or the like to each pixel PX of the display panel 10. The first power source voltage ELVSS may have a higher voltage level than the second power source voltage ELVSS. The voltage supplied from the power supply 50 is not particularly limited, but the voltage values may be set or controlled according to a fourth control signal $CONT_4$ transmitted from the signal controller 60.

The signal controller 60 may convert the externally received input image data to an image data signal DATA and transmit the image data signal DATA to the data driver 30. The signal controller 60 may generate control signals $CONT_1$, $CONT_2$, and $CONT_3$ based on a synchronization signal, a clock signal, or the like received from the outside. That is, the signal controller 60 may generate the first control signal $CONT_1$ for controlling the operation of the gate driver 20, the second control signal $CONT_2$ for controlling the operation of the data driver 30, and the third control signal $CONT_3$ for controlling the operation of the light emission driver 40. The signal controller 60 may transmit the generated control signals $CONT_1$, $CONT_2$, and $CONT_3$ to the gate driver 20, the data driver 30, and the light emission driver 40, respectively. The signal controller 60 may generate the fourth control signal (or a power control signal) $CONT_4$ for controlling driving of the power supply 50 and transmit the fourth control signal $CONT_4$ to the power supply 50.

The display device 1 according to an embodiment may be implemented as an electronic device such as a mobile phone, a smart phone, a laptop computer, a smart watch, a navigation device, a game console, a television (TV), a head unit for a vehicle, a laptop computer, a tablet computer, a personal media player (PMP), a personal digital assistants (PDA), and the like.

Hereinafter, an embodiment of a pixel circuit of each pixel PX included in the display panel 10 of FIG. 1 and a driving method thereof will be described with reference to FIGS. 2 to 7.

Figure 2:
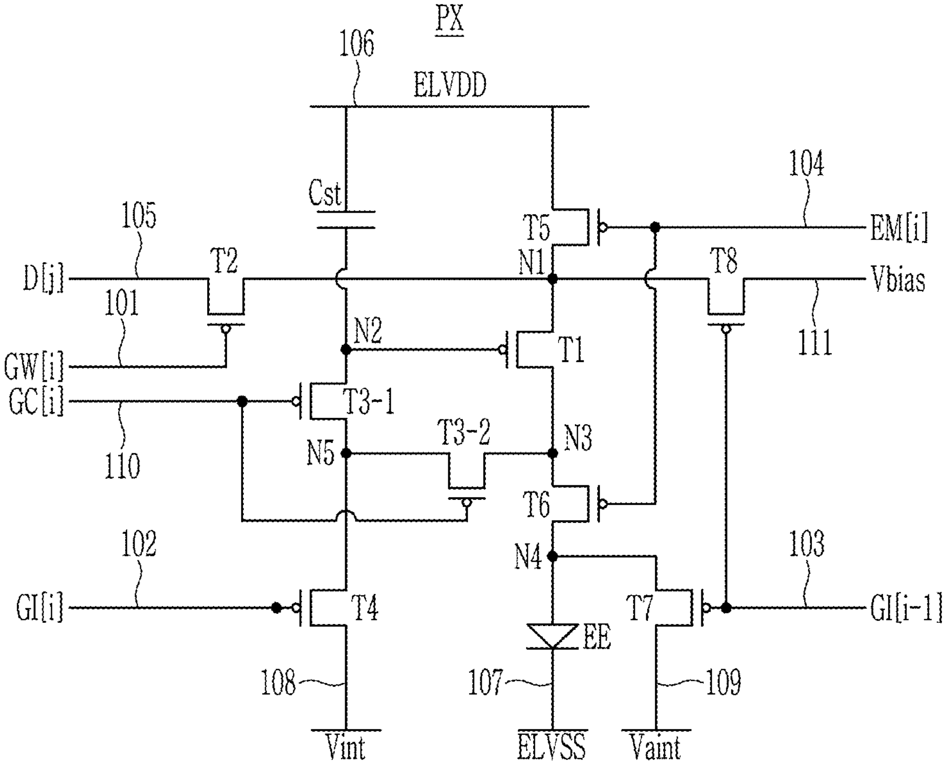
FIG. 2 is a pixel circuit diagram of a pixel according to an embodiment.

FIG. 2 is a pixel circuit diagram of a pixel according to an embodiment.

Referring to FIG. 2, each pixel PX included in the display panel 10 of the display device 1 according to an embodiment may include a plurality of transistors T1, T2, T3-1, T3-2, T4, T5, T6, T7, and T8, a storage capacitor Cst, and a light emitting element EE. Hereinafter the plurality of transistors T1, T2, T3-1, T3-2, T4, T5, T6, T7, and T8 may be referred to as a driving transistor T1, a switching transistor T2, compensation transistors T3-1 and T3-2, an initialization transistor T4, an operation control transistor T5, a light-emission control transistor T6, a light emitting element initialization transistor T7, and a bias transistor T8, respectively.

In an embodiment, a pixel PX may be connected with a plurality of signal lines. The signal lines connected to the pixel PX may include a scan signal line 101 that transmits a scan signal GW[i], a first initialization signal line 102 that transmits a first initialization signal GI[i], a second initialization signal line 103 that transmits a second initialization signal GI[i−1], and a compensation signal line 110 that transmits a compensation signal GC[i]. The scan signal line 101, the first initialization signal line 102, the second initialization signal line 103, and the compensation signal line 110 may be gate lines connected to the gate driver 20 of FIG. 1. That is, the scan signal GW[i], the first initialization signal GI[i], the second initialization signal GI[i−1], and the compensation signal GC[i] may be gate signals output from the gate driver 20.

The signal lines connected with the pixel PX may further include a data signal line 105 that transmits the data signal D[j] output from the data driver 30 of FIG. 1, a light-emission control signal line 104 that transmits the light-emission control signal EM[i] output from the light emission driver 40, the first and second power lines 106 and 107 that transmits the first and second power source voltages ELVDD and ELVSS, the first and second initialization voltage lines 108 and 109 that transmits the first and second initialization voltages Vint and Vaint, and the bias voltage line 111 that transmits the bias voltage Vbias.

The driving transistor T1 may include a first terminal connected to a first node N1, a second terminal connected to a third node N3, and a control terminal connected to a second node N2. The first node N1 may be connected to the first power line 106, which supplies the first power source voltage ELVDD, via the operation control transistor T5. The first node N1 may be connected to the data signal line 105, which transmits the data signal D[j], via the switching transistor T2. The second node N2 may be connected to the second terminal of the storage capacitor Cst. The first node N1 may be connected to the bias voltage line 111, which transmits the bias voltage Vbias, via the bias transistor T8. The second node N2 may also be connected to the first initialization voltage line 108, which transmits the first initialization voltage Vint, via the first compensation transistor T3-1 and the initialization transistor T4. The second node N2 may also be connected to the third node N3 via the first and second compensation transistors T3-1 and T3-2. The third node N2 may be connected to the anode terminal of the light emitting element EE via the light-emission control transistor T6. The driving transistor T1 may provide a driving current corresponding to the data signal D[j] to the light emitting element EE.

The switching transistor T2 may include a first terminal connected with the data signal line 105 that transmits the data signal D[j], a second terminal connected to the first node N1, and a control terminal connected to the scan signal line 101 that transmits the scan signal GW[i]. The switching transistor T2 may be turned on in response to the scan signal GW[i] received through the scan signal line 101. The switching transistor T2 may transmit the data signal D[j] transmitted through the data signal line 105 to the first node N1 (i.e., first terminal of driving transistor T1) when turned on.

The first compensation transistor T3-1 may include a first terminal connected to the second node N2, a second terminal connected to a fifth node N5, and a control terminal connected to the compensation signal line 110 that transmits the compensation signal GC[i]. The second compensation transistor T3-2 may include a first terminal connected to the fifth node N5, a second terminal connected to the third node N3, and a control terminal connected to the compensation signal line 110 that transmits the compensation signal GC[i]. The first and second compensation transistors T3-1 and T3-2 may be turned on in response to the compensation signal GC[i] received through the compensation signal line 110. The first and second compensation transistors T3-1 and T3-2 may diode-connect the driving transistor T1 by connecting the second node N2 and the third node N3 (i.e., the second terminal and the control terminal of the driving transistor T1) to each other when turned on. The data voltage compensated for the threshold voltage of the driving transistor T1 may be written to the storage capacitor Cst for the data signal D[j] by the diode connection of the driving transistor T1.

The initialization transistor T4 may include a first terminal connected to the fifth node N5, a second terminal connected to the first initialization voltage line 108 that transmits the first initialization voltage Vint, and a control terminal connected to the first initialization signal line 102 that transmits the first initialization signal GI[i]. The fifth node N5 may be connected to the second node N2 via the first compensation transistor T3-1. The initialization transistor T4 may be turned on in response to the initialization signal GI[i] received through the first initialization signal line 102. The initialization transistor T4 may transmit the first initialization voltage Vint to the second node N2 when turned on. That is, when the initialization transistor T4 is turned on while the first compensation transistor T3-1 is turned on, the first initialization voltage Vint may be transmitted to the second node N2 through the initialization transistor T4 and the first compensation transistor T3-1. When the first initialization voltage Vint is transmitted to the second node N2, the control terminal voltage of the driving transistor T1 and the voltage of the storage capacitor Cst can be initialized by the first initialization voltage Vint. The first initialization voltage Vint may have a lower voltage level than a voltage level of the data signal D[j]. When the display panel 10 operates at a low driving frequency, if the first initialization voltage Vint supplied to the second node N2 is too low, the hysteresis change of the driving transistor T1 may become severe, causing a flicker phenomenon. Accordingly, the first initialization voltage Vint may have a higher voltage level than the second power source voltage ELVSS.

The operation control transistor T5 may include a first terminal connected to the first power line 106 supplying the first power source voltage ELVDD, a second terminal connected to the first node N1, and a control terminal connected to the light-emission control signal line 104 that transmits the light-emission control signal EM[i]. The light-emission control transistor T6 may include a first terminal connected to the third node N3, a second terminal connected to the fourth node N4, and a control terminal connected to the light-emission control signal line 104 that transmits the light-emission control signal EM[i]. The fourth node N4 may be connected to the anode terminal of the light emitting element EE. The operation control transistor T5 and the light-emission control transistor T6 may both be turned on simultaneously in response to the light-emission control signal EM[i] received through the light-emission control signal line 104. When both the operation control transistor T5 and the light-emission control transistor T6 are turned on, the driving current generated by the driving transistor T1 may flow to the light-emitting element EE.

The light emitting element initialization transistor T7 may include a first terminal connected to the fourth node N4, a second terminal connected to the second initialization voltage line 109 that transmits the second initialization voltage Vaint, and a control terminal connected to the second initialization signal line 103 that transmits the second initialization signal GI[i−1]. The light emitting element initialization transistor T7 may be turned on according to the second initialization signal GI[i−1] received through the second initialization signal line 103. The light emitting element initialization transistor T7 may initialize a voltage of the anode terminal of the light emitting element EE to the second initialization voltage Vaint by transmitting the second initialization voltage Vaint to the anode terminal of the light emitting element EE when turned on. When the second initialization voltage Vaint is transmitted to the anode terminal of the light emitting element EE, the parasitic capacitor of the light emitting element EE is discharged, thereby effectively preventing unintended microscopic light emitting, and thus improving the black expression capability of the pixel circuit. The second initialization voltage Vaint may have a same as or a different voltage level from the first initialization voltage Vint. The second initialization voltage Vaint may have a lower voltage level than the voltage level of the data signal D[j]. When the second initialization voltage Vaint supplied to the fourth node N4 exceeds a predetermined value, the parasitic capacitor of the light emitting element EE may be charged rather than discharged. Therefore, the second initialization voltage Vaint may be set to a sufficiently low voltage (e.g., lower than the second power source voltage ELVSS) to discharge the parasitic capacitor of the light emitting element EE.

The bias transistor T8 may include a first terminal connected to the bias voltage line 111 that transmits the bias voltage Vbias, a second terminal connected to the first node N1, and a control terminal connected to the second initialization signal line 103 that transmits the second initialization signal GI[i−1]. The bias transistor T8 may be turned on in response to the second initialization signal GI[i−1] received through the second initialization signal line 103. The bias transistor T8 may initialize the hysteresis characteristic of the driving transistor T1 by transmitting the bias voltage Vbias to the first node N1 when turned on. Accordingly, the luminance change due to hysteresis of the driving transistor T1 can be improved. The bias voltage Vbias may have a voltage level that can alleviate the hysteresis characteristic of the driving transistor T1 by maintaining the driving transistor T1 in the pixel PX in a specific on-bias state. The bias voltage Vbias may have a predetermined voltage level within the voltage range of the data signal D[j], or the on voltage level of the scan signal GW[i].

The storage capacitor Cst may include a first terminal connected to the first power line 106 that transmits the first power source voltage ELVDD, and a second terminal connected to the second node N2. The storage capacitor Cst may store the data voltage corresponding to the data signal D[j].

The light emitting element EE may include an anode terminal connected to the fourth node N4, and a cathode terminal connected to the second power line 107 that transmits the second power source voltage ELVSS. The light emitting element EE may emit light by receiving the driving current generated by the driving transistor T1.

At least one of the plurality of transistors T1, T2, T3-1, T3-2, T4, T5, T6, T7, and T8 constituting the pixel circuit may be a transistor having a low-temperature polycrystalline silicon (LTPS) semiconductor layer. In addition, one of the first and second terminals of each of transistors T1, T2, T3-1, T3-2, T4, T5, T6, T7, and T8 may be a drain terminal and the other thereof may be a source terminal. In addition, the control terminal of each of transistors T1, T2, T3-1, T3-2, T4, T5, T6, T7, and T8 may be a gate terminal.

In an embodiment, as shown in FIG. 2, the plurality of transistors T1, T2, T3-1, T3-2, T4, T5, T6, T7, and T8 constituting the pixel circuit may be P-type transistors, but the type of each transistor is not particularly limited. In another embodiment, for example, at least one of the plurality of transistors T1, T2, T3-1, T3-2, T4, T5, T6, T7, and T8 constituting the pixel circuit may be an N-type transistor. In some embodiments, among the plurality of transistors T1, T2, T3-1, T3-2, T4, T5, T6, T7, and T8, the first compensation transistor T3-1 may be an N-type transistor and the other transistors may be P-type transistors. In such embodiments, the compensation signal line 110 may include a first compensation signal line connected to the control terminal of the first compensation transistor T3-1 and a second compensation signal line connected to the control terminal of the second compensation transistor T3-2. The levels of the compensation signal transmitted to the first compensation signal line and the compensation signal transmitted to the second compensation signal line may be opposite to each other. This will be described later with reference to FIG. 12.

In an embodiment, as shown in FIG. 2, the control terminals of the light emitting element initialization transistor T7 and the bias transistor T8 of each pixel PX may be connected to a same wiring, that is, the second initialization signal line 103. The first and second initialization signal lines 102 and 103 may be initialization signal lines connected to stages of the initialization driver 23 of FIG. 1. The stage connected to the second initialization signal line 103 in the initialization driver 23 may be the stage preceding the stage connected to first initialization signal line 102 in the initialization driver 23. Therefore, the second initialization signal GI[i−1] is an initialization signal output from the stage preceding the stage that outputs the first initialization signal GI[i], and may be a previous initialization signal output before the first initialization signal GI[i]. In addition, the first initialization signal GI[i] may have activation levels (i.e., on voltage levels) in different horizontal periods from the second initialization signal GI[i−1].

In an embodiment, as shown in FIG. 2, the first initialization signal GI[i] applied to the initialization transistor T4 may be applied as an initialization signal to a light emitting element initialization transistor and a bias transistor of other pixels PX. That is, the initialization transistor T4 may share an initialization signal wire (i.e., the first initialization signal line 102) with a light emitting element initialization transistor T7 and a bias transistor T8 of another pixel. Another pixel sharing the initialization transistor T4 and the first initialization signal line 102 may be a pixel connected to a stage next to the stage to which the current pixels PX are connected among a plurality of stages included in the scan driver 21. That is, another pixel that shares the initialization transistor T4 and the first initialization signal line 102 may be a pixel included in a different pixel row (a next pixel row) than the current pixels PX.

In an embodiment, as shown in FIG. 2, the second initialization signal GI[i−1] applied to the light emitting element initialization transistor T7 and the bias transistor T8 may also be applied as an initialization signal to an initialization transistor of other pixels PX. That is, the light emitting element initialization transistor T7 and the bias transistor T8 may share an initialization signal wire (i.e., the second initialization signal line 103) with an initialization transistor T4 of another pixel. Another pixel PX that shares the light emitting element initialization transistor T7 and the bias transistor T8 and the second initialization signal line 103 may be a pixel connected to a stage preceding the stage to which the current pixels PX are connected among the plurality of stages included in the scan driver 21. That is, another pixel PX that shares the light emitting element initialization transistor T7 and the bias transistor T8 and the second initialization signal line 103 may be a pixel included in a different pixel row (a previous pixel row) than the current pixels PX.

In an embodiment, as described above, the first initialization signal line 102 connected to the initialization transistor T4 is commonly connected to the light emitting element initialization transistor and the bias transistor of another pixel, and the second initialization signal line 103 connected to the light emitting element initialization transistor T7 and the bias transistor T8 are commonly connected to the initialization transistors of another pixel, and accordingly the number of horizontal wires extending in the first direction (horizontal direction in FIG. 1) in the display panel 10 can be reduced.

Figure 3:
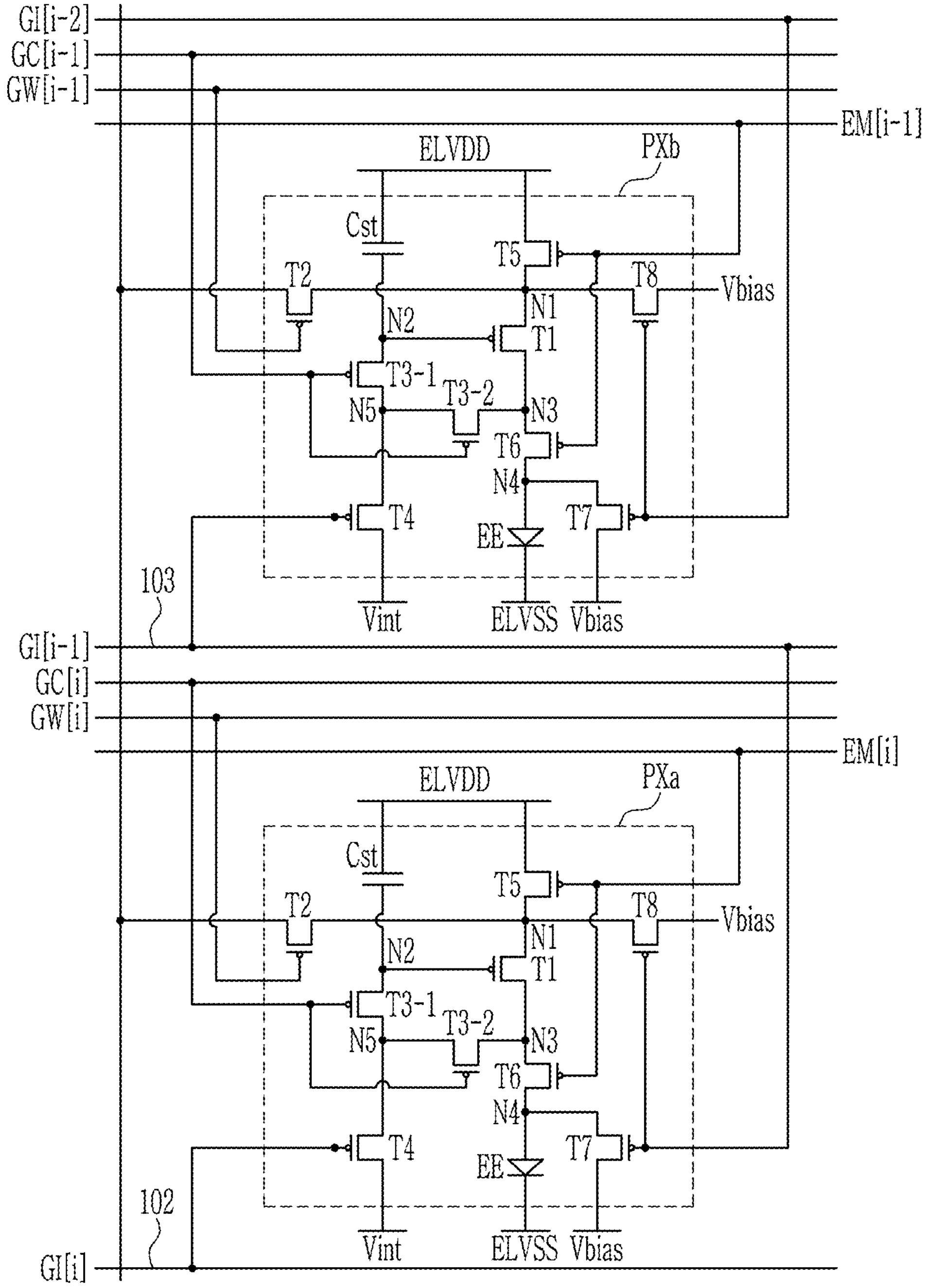
FIG. 3 a pixel circuit diagram illustrating an embodiment where the pixel circuit of FIG. 2 shares an initialization signal line.
Figure 4:
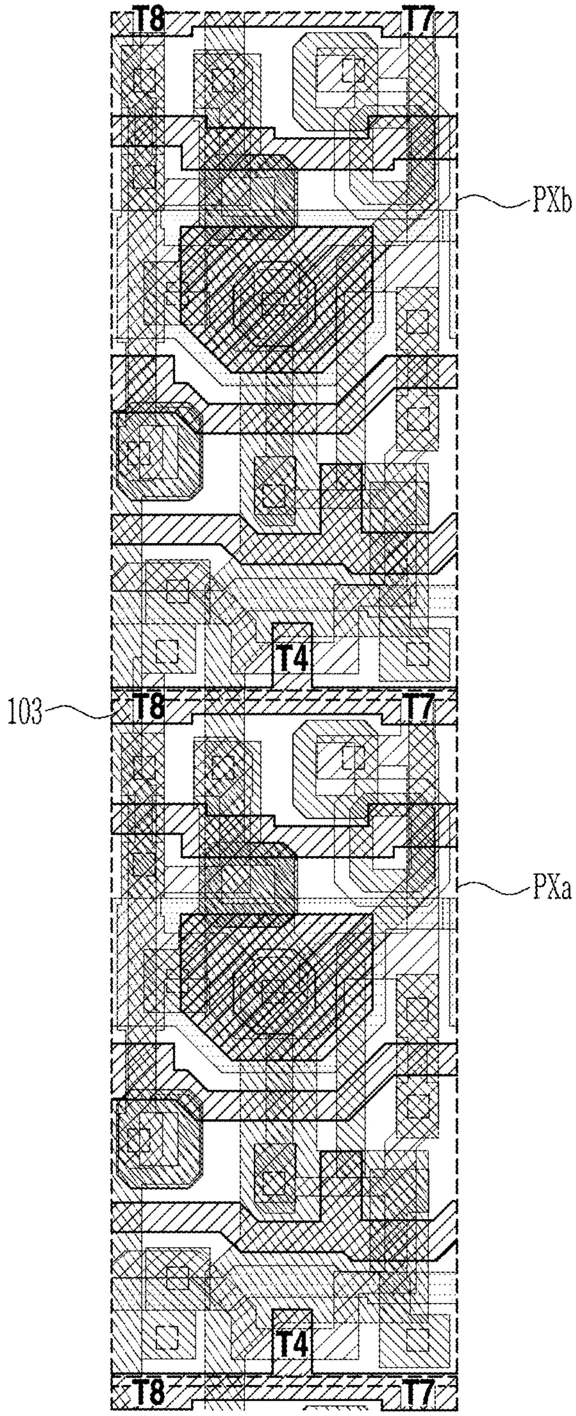
FIG. 4 is a plan view of pixels of FIG. 3.

FIG. 3 a pixel circuit diagram illustrating an embodiment where the pixel circuit of FIG. 2 shares an initialization signal line. FIG. 4 is a plan view of pixels of FIG. 3.

Referring to FIG. 3 and FIG. 4, in an embodiment, a first pixel PXa connected to an i-th scan signal line and a j-th data signal line may share the second initialization signal line 103 with a second pixel PXb connected to an (i−1)-th scan signal line and the j-th data signal line. That is, the second initialization signal line 103 may be connected to control terminals of a light emitting element initialization transistor T7 and a bias transistor T8 of the first pixel PXa and may be connected to an initialization transistor T4 of the second pixel PXb. Therefore, the initialization signal GI[i−1] supplied through the second initialization signal line 103 may simultaneously control the light emitting element initialization transistor T7 and the bias transistor T8 of the first pixel PXa, and the initialization transistor T4 of the second pixel PXb. Accordingly, the signal wires for supplying initialization signals to the pixels PX can be reduced, enabling high integration of the display panel 10.

Figure 5:
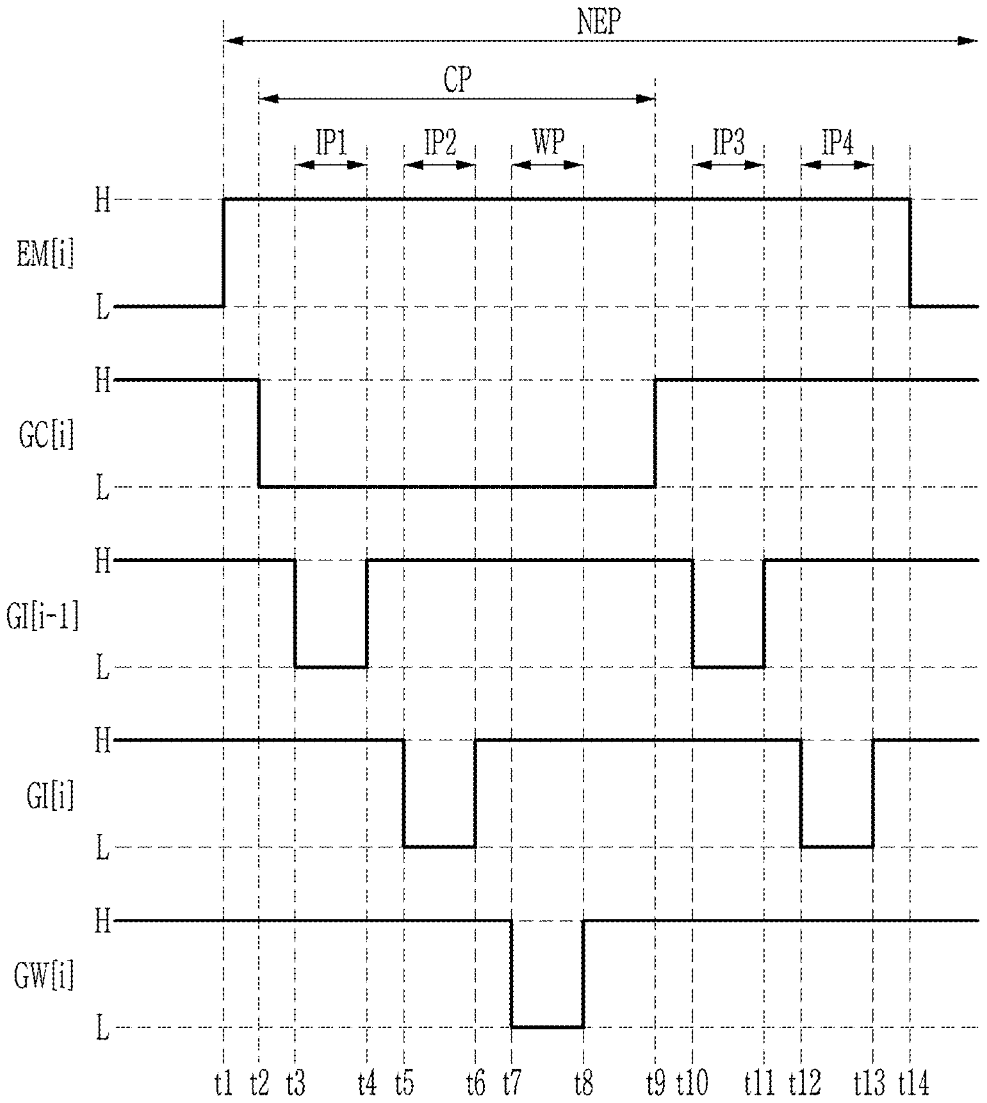
FIG. 5 is a signal timing diagram for description of the operation of the pixel according to an embodiment.

FIG. 5 is a signal timing diagram for description of the operation of the pixel according to an embodiment, showing the timing of signals applied to the pixel circuit of FIG. 2 during a data writing period.

Referring to FIG. 5, at a first time point t1, a light-emission control signal EM[i] of a high level H may be supplied to a pixel PX through the corresponding light-emission control signal line 104. During a non-light emitting period NEP between the first time point t1 at which the high-level light-emission control signal EM[i] is supplied and a tenth time point t10, the operation control transistor T5 and the light-emission control transistor T6 may maintain a turned-off state. Therefore, during the non-light emitting period NEP, the electrical connection between the first power source voltage ELVDD and the driving transistor T1 is interrupted, and as a result, the electrical connection between the driving transistor T1 and the light emitting element EE is interrupted such that the light emitting element EE may remain in the non-light emitting state.

At a second time point t2, a compensation signal GC[i] of a low level L may be supplied to a pixel PX through the corresponding compensation signal line 110. During a compensation period CP between the second time point t2 at which the low-level compensation signal GC[i] is supplied and a ninth time point t9, the first and second compensation transistors T3-1 and T3-2 may maintain in a turned-on state. Accordingly, the driving transistor T1 may be diode-connected by the first and second compensation transistors T3-1 and T3-2 during the compensation period CP.

At a third time point t3, a low level second initialization signal GI[i−1] may be supplied to a pixel PX through the corresponding second initialization signal line 103. During a first initialization period IP1 between the third time point t3 at which the low-level second initialization signal GI[i−1] is supplied and a fourth time point t4, the light emitting element initialization transistor T7 and the bias transistor T8 may maintain in a turned-on state. Therefore, during the first initialization period IP1, the second initialization voltage Vaint is transmitted to the anode terminal of the light emitting element EE through the light emitting element initialization transistor T7, and the anode terminal voltage of the light emitting element EE may be initialized. In addition, during the first initialization period IP1, the bias voltage Vbias is transmitted to the first terminal of the driving transistor T1, and the hysteresis characteristic of the driving transistor T1 may be initialized.

At a fifth time point t5, a first initialization signal GI[i] of a low level may be supplied to a pixel PX through the corresponding first initialization signal line 102. During a second initialization period IP2 between the fifth time point t5 at which the low level first initialization signal GI[i] is supplied and a sixth time point t6, the initialization transistor T4 may maintain a turned-on state. During the second initialization period IP2, the first compensation transistor T3-1 may also maintain a turned-on state. Therefore, during the second initialization period IP2, the first initialization voltage Vint is transmitted to the second node N2 through the initialization transistor T4 and the first compensation transistor T3-1, and a voltage of the control terminal of the driving transistor T1 and the storage capacitor Cst may be initialized to the first initialization voltage Vint, which is lower than the voltage of the data signal D[j].

At a seventh time point t7, a scan signal GW[i] of a low level may be supplied to a pixel PX through the corresponding scan signal line 101. During a write period WP between the seventh time point t7 at which the low level scan signal GW[i] is supplied and an eight time point time t8, the switching transistor T2 may maintain a turned-on state. During the write period WP, a data signal D[j] corresponding to a pixel PX may be supplied through the corresponding data signal line 105. Therefore, during the write period WP, the data signal D[j] may be transmitted to the first node N1. During the write period WP, the first and second compensation transistors T3-1 and T3-2 may also maintain a turned-on state. Therefore, during the write period WP, a voltage (Vdata+Vth) obtained by reflecting a data voltage (Vdata) of the data signal D[j] to a threshold voltage (Vth) of the driving transistor T1 is reflected in the data voltage (Vdata) is transmitted to the second node N2 by the diode-connected driving transistor T1, the voltage corresponding to the storage capacitor Cst may be stored.

At the ninth time point t9, a compensation signal GC[i] of the high level H may be supplied to a pixel PX through the corresponding compensation signal line 110. The first and second compensation transistors T3-1 and T3-2 may be turned off by the compensation signal GC[i] of the high level H.

At the tenth time point t10, a second initialization signal GI[i−1] of the low level L may be supplied again to the pixel PX through the corresponding second initialization signal line 103. During a third initialization period IP3 between t10, at which the low-level second initialization signal GI[i−1] is supplied, and an eleventh time point t11, the light emitting element initialization transistor T7 and the bias transistor T8 may maintain the turned-on state. Therefore, during the third initialization period IP3, the second initialization voltage Vaint may be to the anode terminal of the light emitting element EE through the light emitting element initialization transistor T7, and the anode terminal voltage of the light emitting element EE may be initialized again. In addition, during the third initialization period IP3, the bias voltage Vbias is transmitted to the first terminal of the driving transistor T1, and the hysteresis characteristic of the driving transistor T1 may be initialized again.

At a twelfth time point t12, a first initialization signal GI[i] of the low level may be supplied to the pixel PX through the corresponding first initialization signal line 102. During a fourth initialization period IP4 between the twelfth time point t12, at which the low-level first initialization signal GI[i] is supplied, and a thirteenth time point t13, the initialization transistor T4 may maintain the turned-on state, but the first compensation transistor T3-1 may maintain the turned-off state. Therefore, in the fourth initialization section IP4, the control terminal voltage of the driving transistor T1 and the initialization operation of the storage capacitor Cst may not be performed.

At a fourteenth time point t14, a light-emission control signal EM[i] of the low line L may be supplied to the pixel PX through the corresponding light-emission control signal line 104. The operation control transistor T5 and the light-emission control transistor T6 may be turned on by the light-emission control signal EM[i] of the low level L. Therefore, the first power source voltage ELVDD and the driving transistor T1 may be electrically connected to each other, and the driving transistor T1 and the light emitting element EE may be electrically connected to each other. As a result, a driving current flows to the light emitting element EE through the driving transistor T1, and the light emitting element EE may emit light.

In some embodiments, the display device 1 may operate in a variable frequency mode. A plurality of frame sections in which the display device 1 operates in a variable frequency mode may include a first frame section in which a plurality of data signals are applied to the plurality of pixels PX, a data voltage is written to each of the plurality of pixels PX by the plurality of data signals, and the plurality of pixels PX emit light based on the data voltage, and a plurality of second frame section in which the plurality of pixels PX emit light based on the data voltage already stored without writing the data voltage. In the plurality of second frame sections, the data voltage is not written to each pixel PX, but the initialization operation of the light emitting element EE and the bias operation of the driving transistor T1 may be performed. Therefore, a non-light emitting period NEP of each of the plurality of second frame sections may include only the initialization periods IP1 to IP4 without including the compensation period CP and the write period WP. This will be described with reference to FIG. 6.

Figure 6:
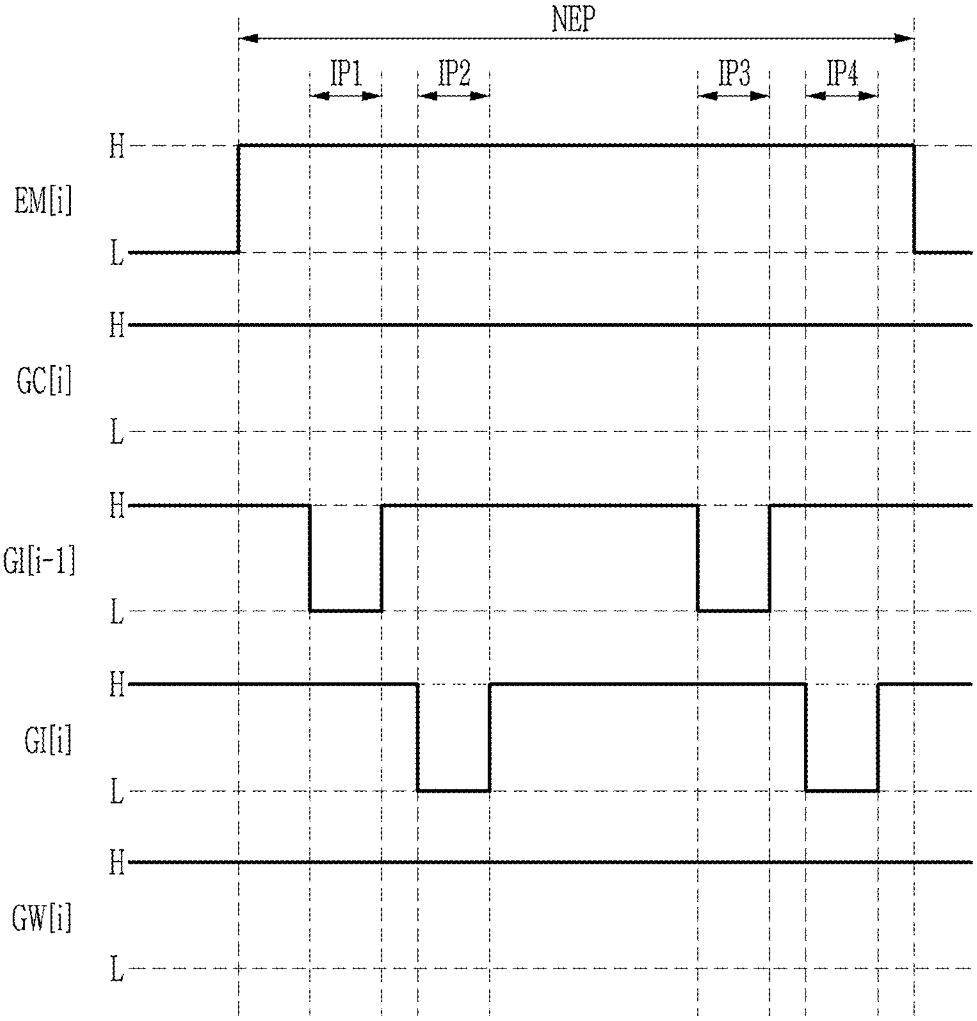
FIG. 6 is a signal timing diagram for description of the operation of the pixel according to an embodiment.
Figure 7:
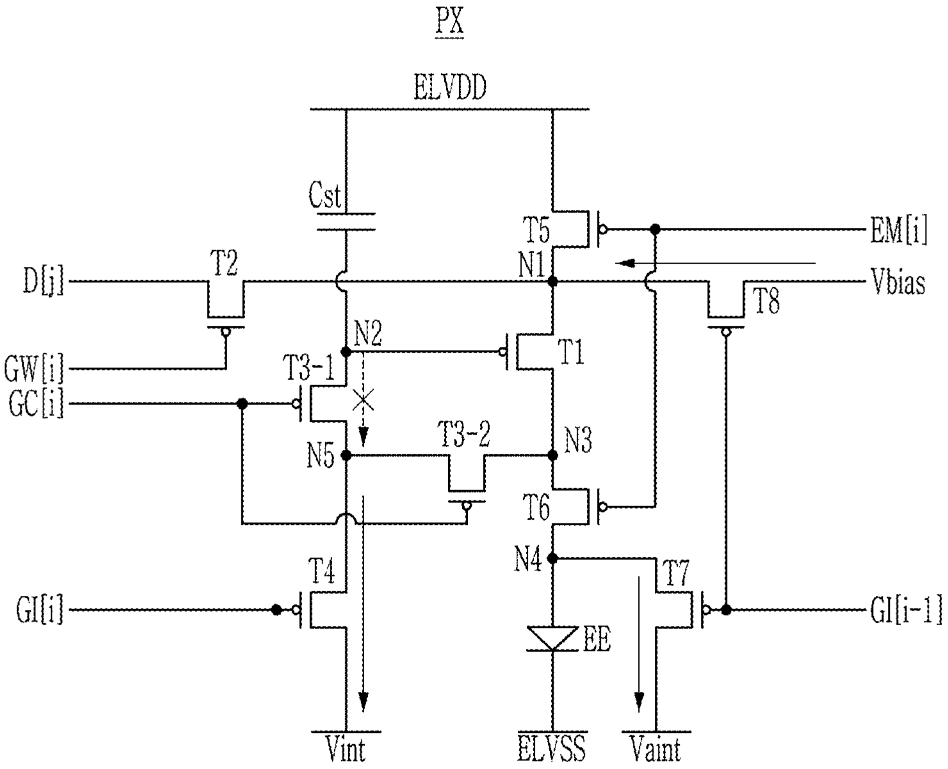
FIG. 7 is a pixel circuit diagram for description of the operation of the pixel circuit in the variable frequency mode according to an embodiment.

FIG. 6 is a signal timing diagram for description of the operation of the pixel according to an embodiment, and illustrates the timing of signals applied to the pixel circuit of FIG. 2 during a self-scan period. In addition, FIG. 7 is a circuit diagram for description of the operation of the pixel circuit in the variable frequency mode according to an embodiment.

Referring to FIG. 6, during a plurality of second frame periods of the display device 1, the compensation signal GC[i] and the scan signal GW[i] may be maintained at an off voltage level (or deactivation level) in a non-light emitting period NEP in which the light-emission control signal EM[i] is maintained at a high level. In an embodiment, for example, during the non-light emitting period NEP of each of the plurality of second frame periods, the compensation signal GC[i] of the high level H may be supplied to the pixel PX through the compensation signal line 110, and the scan signal GW[i] of the high level H may be supplied to the pixel PX through the scan signal line 101.

Therefore, the control terminal voltage of the driving transistor T1 and the initialization operation of the storage capacitor Cst may not be performed in the second and fourth initialization sections IP2 and IP4, during which the low-level first initialization signal GI[i] is supplied. Referring to FIG. 7, since the compensation signal GC[i] maintains a high level, which is an off voltage level, during the self-scan period, the first and second compensation transistors T3-1 and T3-2 may be maintained in the turned-off state. Therefore, even if the low-level first initialization signal GI[i] is supplied in the second and fourth initialization sections IP2 and IP4 and the initialization transistor T4 is turned on, the transmission of the first initialization voltage Vint may be blocked by the first compensation transistor T3-1 in the turned-off state. In such an embodiment, when the low-level second initialization signal GI[i−1] is supplied in the first and third initialization periods IP1 and IP3 during the self-scan period, the light emitting element initialization transistor T7 and the bias transistor T8 are turned on normally, and the initialization operation of the light emitting element EE and the bias operation (hysteresis characteristic initialization) of the driving transistor T1 may also be performed normally. Hereinafter, various embodiments of the pixel circuit will be described with reference to FIGS. 8 to 13. Hereinafter, for convenience of description, any repetitive detailed descriptions of the same or like components as those of the pixel circuit described above may be omitted.

Figure 8:
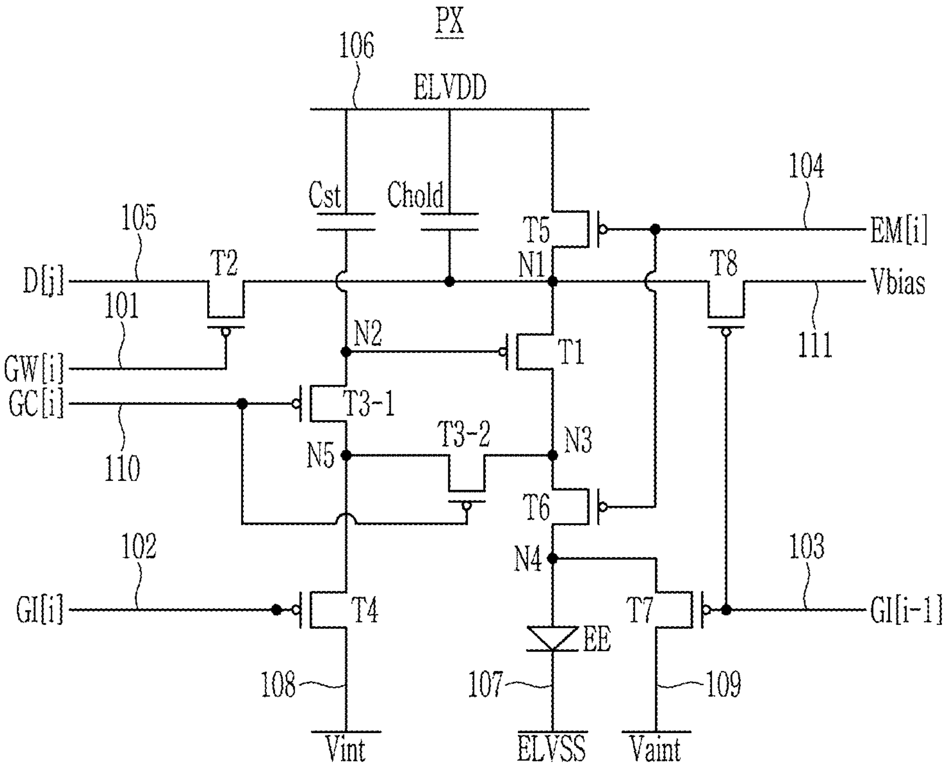
FIG. 8 is a pixel circuit diagram of a pixel according to another embodiment.

FIG. 8 is a pixel circuit diagram of a pixel according to another embodiment.

In another embodiment, as shown in FIG. 8, a pixel circuit may further include a hold capacitor Chold. Referring to FIG. 8, the hold capacitor Chold may include a first terminal connected to the first power line 106 providing the first power source voltage ELVDD, and a second terminal connected to the first node N1. The hold capacitor Chold may perform the function of maintaining the voltage of the first node (i.e., the first terminal of the driving transistor T1) constant.

Figure 9:
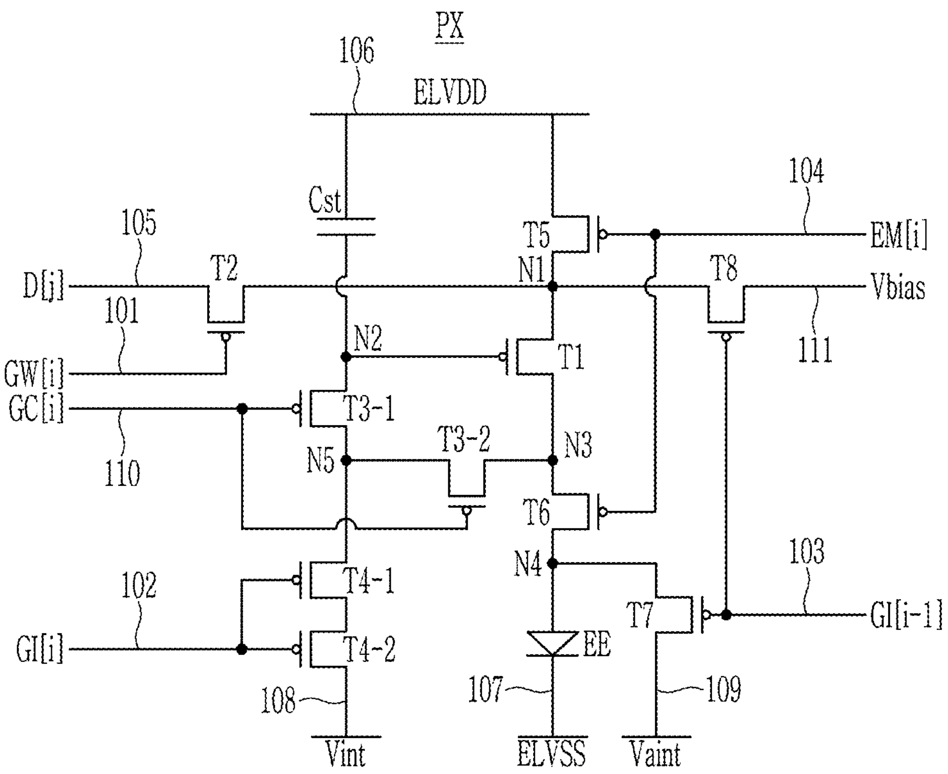
FIG. 9 is a pixel circuit diagram of a pixel according to another embodiment.

FIG. 9 is a pixel circuit diagram of a pixel according to another embodiment.

In another embodiment, as shown in FIG. 9, a pixel circuit may reduce a leakage current by configuring an initialization transistor as a dual transistor. Referring to FIG. 9, the pixel circuit may include first and second initialization transistors T4-1 and T4-2 performing the function of the initialization transistor T4 of FIG. 2. The first and second initialization transistors T4-1 and T4-2 may be coupled to each other in series between the fifth node N5 and the initialization voltage line 108, and control terminals may be connected to the first initialization signal line 102. That is, the first initialization transistor T4-1 may include a first terminal connected to the fifth node N5, a second terminal connected to a first terminal of the second initialization transistor T4-2, and the control terminal connected to the first initialization signal line 102. In addition, the second initialization transistor T4-2 may include a first terminal connected to the second terminal of the first initialization transistor T4-1, a second terminal connected to the initialization voltage line 108, and the control terminal connected to the first initialization signal line 102. The first and second initialization transistors T4-1 and T4-2 may be turned on by the first initialization signal GI[i], similar to the initialization transistor T4 of FIG. 2.

Figure 10:
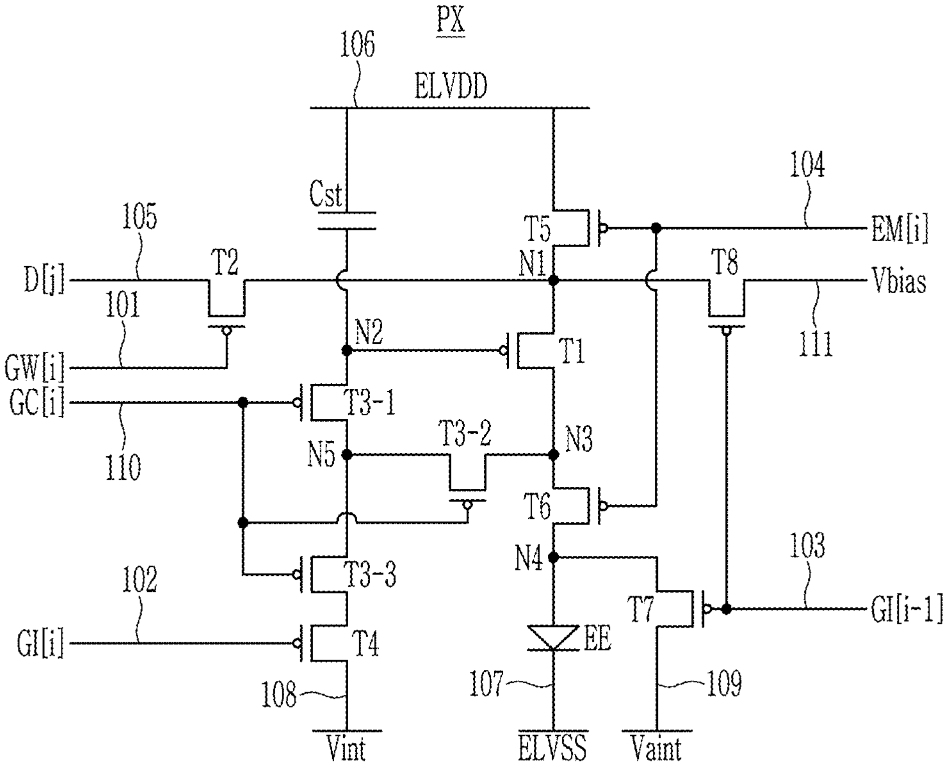
FIG. 10 is a pixel circuit diagram of a pixel according to another embodiment.

FIG. 10 is a pixel circuit diagram of a pixel according to another embodiment.

In another embodiment, as shown in FIG. 10, a pixel circuit of FIG. 10 may further include a third compensation transistor T3-3 to reduce a leakage current. Referring to FIG. 10, the pixel circuit may additionally include a third compensation transistor T3-3 connected between the fifth node N5 and the initialization transistor T4. The third compensation transistor T3-3 may include a first terminal connected to the fifth node N5, a second terminal connected to the first terminal of the initialization transistor T4, and a control terminal connected to the compensation signal line 110. The third compensation transistor T3-3 may be turned on by the compensation signal GC[i].

Figure 11:
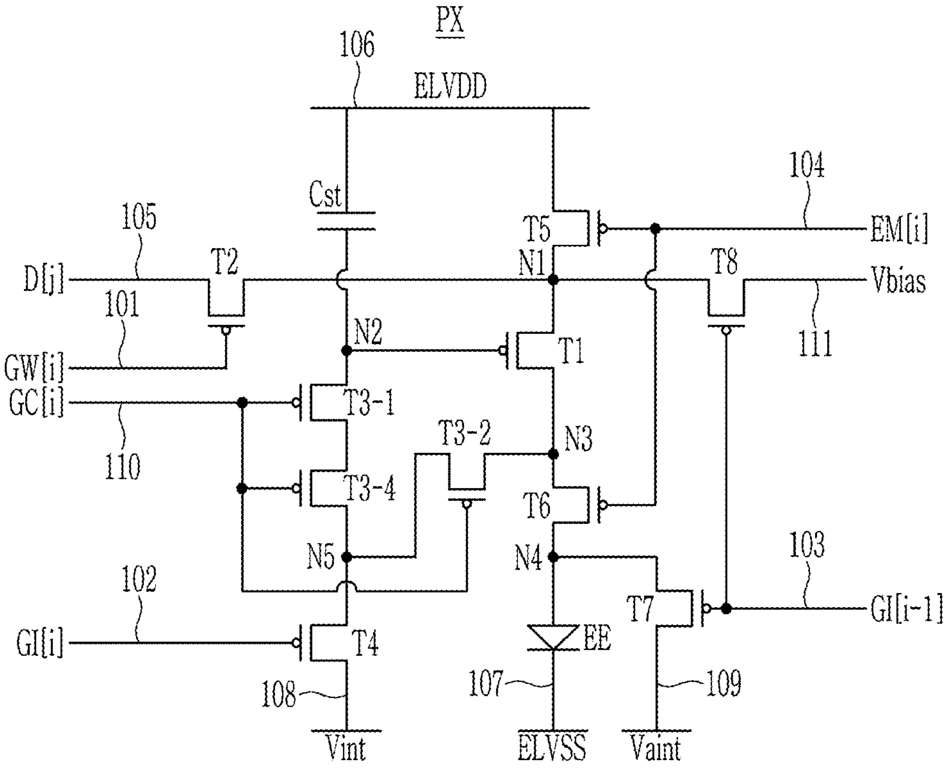
FIG. 11 is a pixel circuit diagram of a pixel according to another embodiment.

FIG. 11 is a pixel circuit diagram of a pixel according to another embodiment.

In another embodiment, as shown in FIG. 11, a pixel circuit by may further include a fourth compensation transistor T3-4 to reduce a leakage current. Referring to FIG. 11, the pixel circuit may further include the fourth compensation transistor T3-4 connected between the first compensation transistor T3-1 and the fifth node N5. The fourth compensation transistor T3-4 may include a first terminal connected to the second terminal of the first compensation transistor T3-1, a second terminal connected to the fifth node N5, and a control terminal connected to the compensation signal line 110. The first compensation transistor T3-4 may be turned by the compensation signal GC[i].

Figure 12:
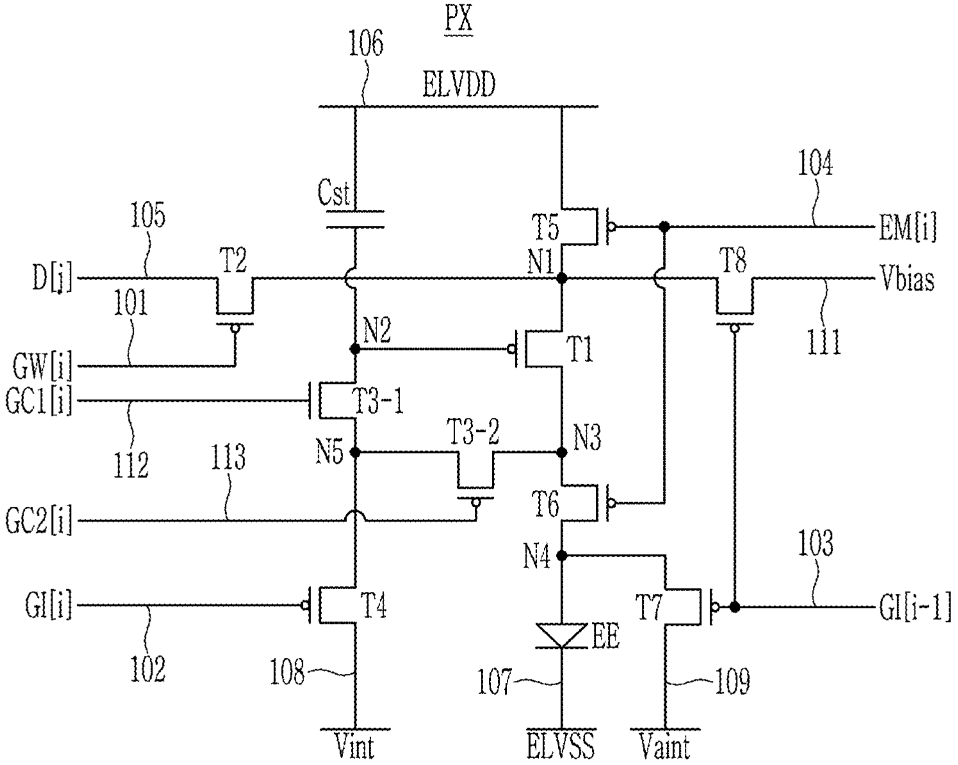
FIG. 12 is a pixel circuit diagram of a pixel according to another embodiment.
Figure 13:
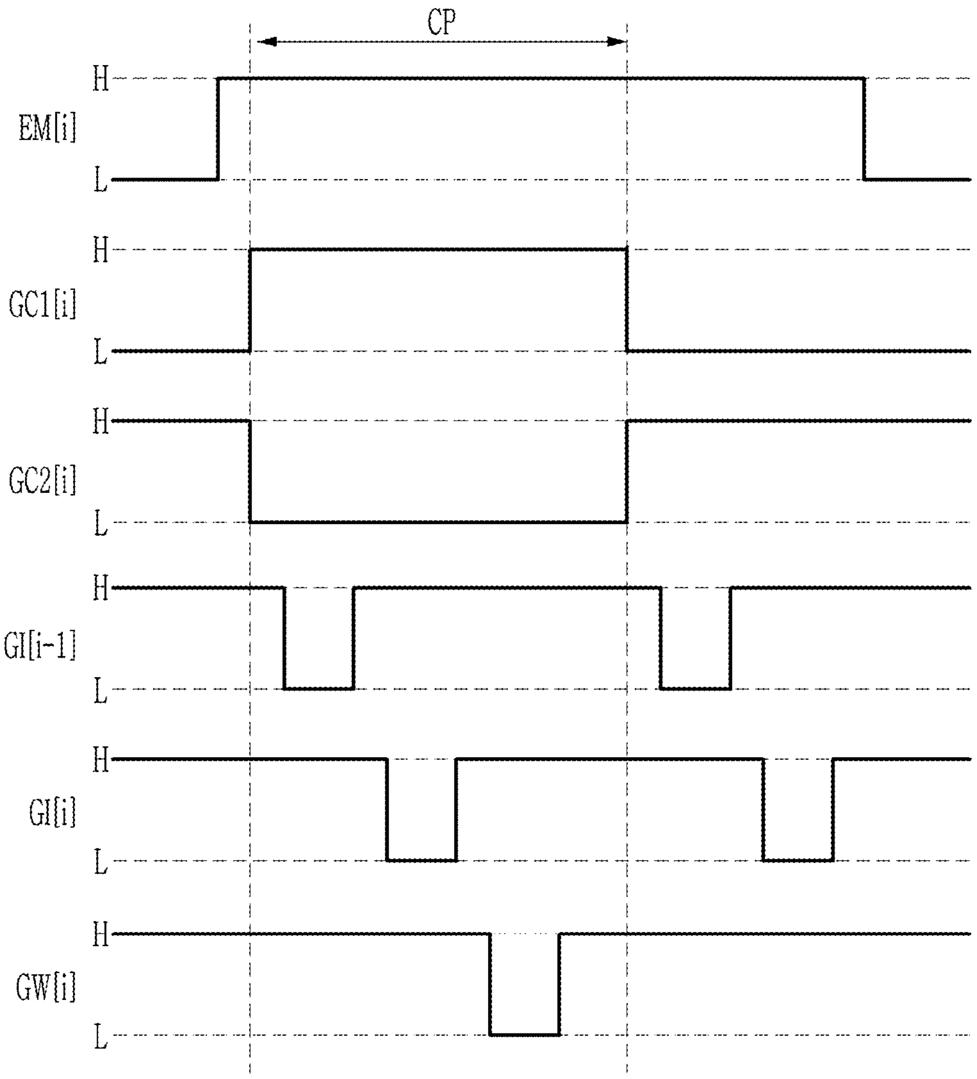
FIG. 13 is a signal timing diagram for description of the operation of the pixel circuit of FIG. 12.

FIG. 12 is a pixel circuit diagram of a pixel according to another embodiment. FIG. 13 is a signal timing diagram for description of the operation of the pixel circuit of FIG. 12.

In an embodiment, as shown in FIG. 12, the first compensation transistor T3-1 and the second compensation transistor T3-2 of the pixel circuit have different types, and a compensation signal line may be further included for independent control of the first compensation transistor T3-1 and the second compensation transistor T3-2. Referring to FIG. 12, compensation signal lines connected to the pixel PX may include a first compensation signal line 112 that transmits a first compensation signal GC1[*i*] to a N-type first compensation transistor T3-1 and a second compensation signal line 113 that transmits a second compensation signal GC2[*i*] to a P-type second compensation transistor T3-2. Therefore, as shown in FIG. 13, during a compensation period CP, the first compensation signal GC1[*i*] and the second compensation signal GC2[*i*], of which signal levels are opposite to each other, may be input to the first compensation transistor T3-1 and the second compensation transistor T3-2, respectively. During the compensation period CP, the first compensation transistor T3-1 may be turned on by the first compensation signal GC1[*i*] of a high level, and the second compensation transistor T3-2 may be turned on by the second compensation signal GC2[*i*] of a low level. In an embodiment, as shown in in FIG. 12, although driving timings of the first compensation signal GC1[*i*] and the second compensation signal GC2[*i*] may be the same as each other, the driving timings of the first compensation signal GC1[*i*] and the second compensation signal GC2[*i*] may be set differently from or independently of each other.

The display device 1 according to the above-described embodiments may be applied to various electronic devices. An electronic device according to an embodiment may include the display device 1, and may further include modules or devices having additional functions other than the display device.

Figure 14:
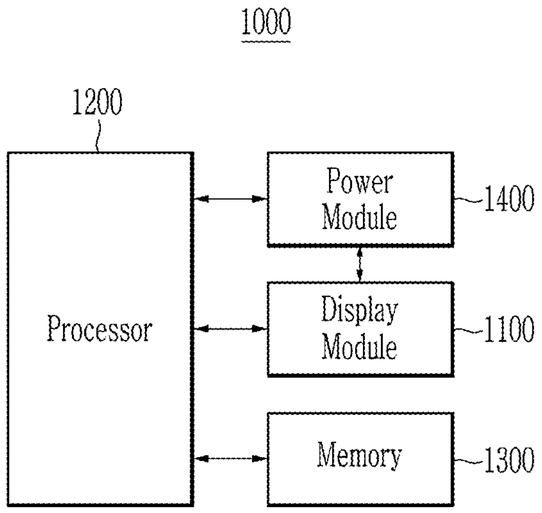
FIG. 14 is a block diagram of an electronic device according to some embodiments.

FIG. 14 is a block diagram of an electronic device according to some embodiments. Referring to FIG. 14, the electronic device 1000 according to an embodiment may include a display module 1100, a processor 1200, a memory 1300, and a power module 1400.

The processor 1200 may include at least one of a central processing unit (CPU), an application processor (AP), a graphic processing unit (GPU), a communication processor (CP), an image signal processor (ISP), and a controller.

The memory 1300 may store data information necessary for operations of the processor 1200 or the display module 1100. When the processor 1200 executes an application stored in the memory 1300, image data signals and/or input control signals are transmitted to the display module 1100, and the display module 1100 can process the received signals to display image through the display screen.

The power module 1400 may include a power supply module such as a power adapter or battery device, and a power conversion module that converts the power supplied by the power supply module to generate the power necessary for the operation of the electronic device 1000.

At least one of components of the electronic device 1000 may be included within the display device 1 according to the above-described embodiments. Additionally, some of the individual modules that are functionally included within a single module may be incorporated into the display device 1, while others may be provided separately from the display device 1. For example, the display device 1 may include the display module 1100, while the processor 1200, memory 1300, and power module 1400 may be provided in a form of other devices within the electronic device 1000 that are not part of the display device 1.

Figure 15:
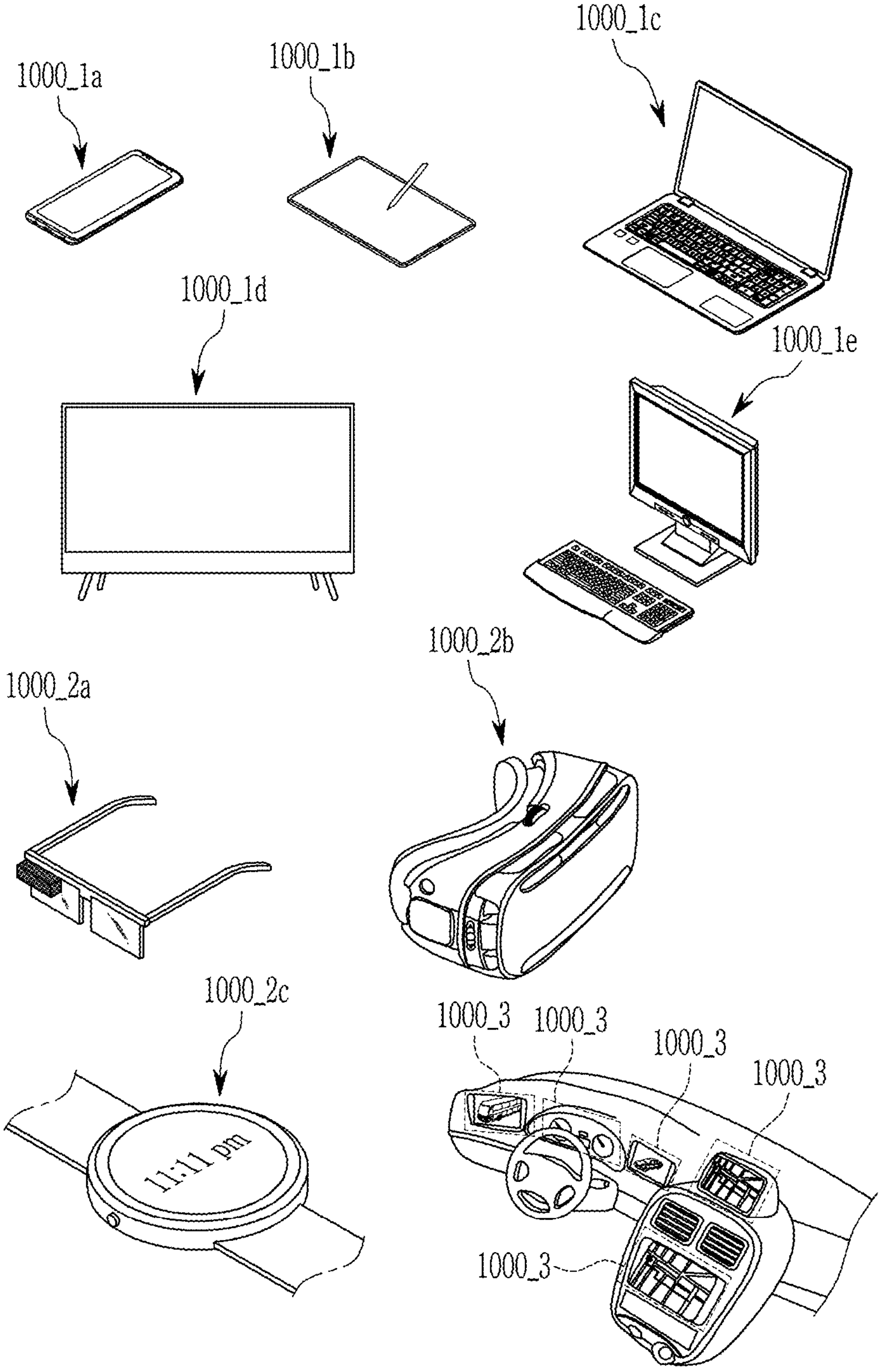
FIG. 15 shows schematic diagrams of electronic devices according to various embodiments.

FIG. 15 shows schematic diagrams of electronic devices according to various embodiments.

Referring to FIG. 15, various electronic devices with the display device according to the embodiments may include not only image display electronic devices such as smartphones 1000_1*a*, tablet PCs 10001_*b*, laptops 1000_1*c*, TVs 1000_1*d*, desktop monitors 1000_1*e*, but also wearable electronic devices with display modules such as smart glasses 1000_2*a*, head-mounted displays 1000_2*b*, smart watches 1000_2*c*, as well as automotive electronic devices with display modules 1000_3 such as those placed on car dashboards, center fascias, CID (Center Information Display), room mirror displays, and so on.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit of a display panel including a plurality of pixel circuits, the pixel circuit comprising:
a light emitting element;
a first transistor connected between a first node and the light emitting element, and including a control terminal connected to a second node;
a second transistor connected between a corresponding data line among a plurality of data lines and the first node, and including a control terminal connected to a first scan signal line among a plurality of scan signal lines connected to the plurality of pixel circuits;
a third transistor connected between the second node and a first initialization voltage line which transmits a first initialization voltage, and including a control terminal connected to a first initialization signal line among a plurality of initialization signal lines connected to the plurality of pixel circuits; and
a fourth transistor connected between the first node and a bias voltage line which transmits a bias voltage, and including a control terminal connected to a second initialization signal line, which is different from the first initialization signal line, among the plurality of initialization signal lines,
wherein the second initialization signal line is connected to a control terminal of a transistor of another pixel circuit and connected to the first initialization voltage line.

2. The pixel circuit of claim 1, wherein
the another pixel circuit is connected to a second scan signal line, which is different from the first scan signal line, among the plurality of scan signal lines.

3. The pixel circuit of claim 1, further comprising:
a fifth transistor connected between the second node and the third transistor, and including a control terminal connected to a corresponding compensation signal line among a plurality of compensation signal lines connected to the plurality of pixel circuits; and
a sixth transistor connected between the first transistor and the third transistor, and including a control terminal connected to the corresponding compensation signal line.

4. The pixel circuit of claim 3, further comprising:
a seventh transistor connected between the fifth transistor and the third transistor, and including a control terminal connected to the corresponding compensation signal line,
wherein the sixth transistor is connected to a node between the fifth transistor and the seventh transistor.

5. The pixel circuit of claim 3, further comprising:
a seventh transistor connected between the fifth transistor and the third transistor, and including a control terminal connected to the corresponding compensation signal line,
wherein the sixth transistor is connected to a node between the third transistor and the seventh transistor.

6. The pixel circuit of claim 3, wherein
in one frame period among a plurality of frame periods during which one image is displayed, the fifth transistor and the sixth transistor are turned on, and in the remaining frame periods among the plurality of frame periods, the fifth transistor and the sixth transistor are in a turned-off state.

7. The pixel circuit of claim 1, further comprising:
a fifth transistor connected between the second node and the third transistor, and including a control terminal connected to a corresponding first compensation signal line among a plurality of first compensation signal lines connected to the plurality of pixel circuits; and
a sixth compensation transistor connected between the first transistor and third transistor, and including a control terminal connected to a corresponding second compensation signal line among a plurality of second compensation signal lines connected to the plurality of pixel circuits,
wherein the fifth transistor is an N-type transistor, and the sixth transistor is a P-type transistor,
wherein levels of signals applied to the corresponding first compensation signal line and the corresponding second compensation signal line are opposite to each other.

8. The pixel circuit of claim 7, wherein
the first transistor to the fourth transistor are P-type transistors.

9. The pixel circuit of claim 1, further comprising:
a fifth transistor connected between a first terminal of the light emitting element and a second initialization voltage line which transmits a second initialization voltage, and including a control terminal connected to the second initialization signal line.

10. The pixel circuit of claim 1, further comprising:
a hold capacitor connected between a first power line which transmits a first power voltage and the first node.

11. The pixel circuit of claim 1, further comprising:
a fifth transistor connected between the second node and the fourth transistor, and including a control terminal connected to the first initialization signal line.

12. The pixel circuit of claim 1, further comprising:
a fifth transistor connected between a first power line which transmits a first power voltage and the first node, and including a control terminal connected to a corresponding light-emission control line among a plurality of light-emission control lines; and
a sixth transistor connected between the first transistor and the light emitting element, and including a control terminal connected to the corresponding light-emission control line.

13. A display device comprising:
a display panel including a plurality of pixels connected to a plurality of scan signal lines, a plurality of initialization lines, and a plurality of data lines;
a scan driver connected to the plurality of scan signal lines, wherein the scan driver provides a plurality of scan signals to the plurality of pixels;
an initialization driver connected to the plurality of initialization signal lines, wherein the initialization driver provides a plurality of initialization signals to the plurality of pixels; and
a data driver connected to the plurality of data lines, wherein the data driver provides a plurality of data signals to the plurality of pixels, wherein a first pixel of the plurality of pixels comprises:

a light emitting element;

a first transistor connected between a first node and the light emitting element and including a control terminal connected to a second node;

a second transistor connected between a corresponding data line among the plurality of data lines and the first node, and including a control terminal connected to a first scan signal line among the plurality of scan signal lines;

a third transistor connected between the second node and a first initialization voltage line which transmits a first initialization voltage, and including a control terminal connected to a first initialization signal line among the plurality of initialization signal lines; and a fourth transistor connected between the first node and a bias voltage line which transmits a bias voltage, and including a control terminal connected to a second initialization signal line, which is different from the first initialization signal line, among the plurality of initialization signal lines, and wherein the second initialization signal line is connected to a control terminal of a transistor of a second pixel and connected to the first initialization voltage line, and wherein the second pixel is connected to a second scan signal line, which is different from the first scan signal line, among the plurality of scan signal lines.

14. The display device of claim 13, wherein the first pixel further comprises:

a fifth transistor connected between the second node and the third transistor, and including a control terminal connected to a corresponding compensation signal line among a plurality of compensation signal lines; and a sixth transistor connected between the first transistor and the third transistor, and including a control terminal connected to the corresponding compensation signal line.

15. The display device of claim 14, wherein in one frame period among a plurality of frame periods during which one image is displayed, the fifth transistor and the sixth transistor are turned on, and in the remaining frame periods among the plurality of frame periods, the fifth transistor and the sixth transistor are in a turned-off state.

16. The display device of claim 13, wherein the first pixel further comprises:

a fifth transistor connected between a first terminal of the light emitting element and a second initialization voltage line which transmits a second initialization voltage, and including a control terminal connected to the second initialization signal line.

17. The display device of claim 13, wherein the first pixel further comprises:

a fifth transistor connected between a first power line which transmits a first power voltage and the first node, and including a control terminal connected to a corresponding light-emission control line among a plurality of light-emission control lines connected to the plurality of pixels; and a sixth transistor connected between the first transistor and the light emitting element, and including a control terminal connected to the corresponding light-emission control line.

18. An electronic device comprising:

a memory;

a processor executing an application stored in the memory; and a display device comprising a display module displaying image based on an input image data from the application, wherein the display device comprises:

a display panel including a plurality of pixels connected to a plurality of scan signal lines, a plurality of initialization lines, and a plurality of data lines;

a scan driver connected to the plurality of scan signal lines, wherein the scan driver provides a plurality of scan signals to the plurality of pixels;

an initialization driver connected to the plurality of initialization signal lines, wherein the initialization driver provides a plurality of initialization signals to the plurality of pixels; and a data driver connected to the plurality of data lines, wherein the data driver provides a plurality of data signals to the plurality of pixels, wherein a first pixel of the plurality of pixels comprises:

a light emitting element;

a first transistor connected between a first node and the light emitting element and including a control terminal connected to a second node;

a second transistor connected between a corresponding data line among the plurality of data lines and the first node, and including a control terminal connected to a first scan signal line among the plurality of scan signal lines;

a third transistor connected between the second node and a first initialization voltage line which transmits a first initialization voltage, and including a control terminal connected to a first initialization signal line among the plurality of initialization signal lines; and a fourth transistor connected between the first node and a bias voltage line which transmits a bias voltage, and including a control terminal connected to a second initialization signal line, which is different from the first initialization signal line, among the plurality of initialization signal lines, and wherein the second initialization signal line is connected to a control terminal of a transistor of a second pixel and connected to the first initialization voltage line, and wherein the second pixel is connected to a second scan signal line, which is different from the first scan signal line, among the plurality of scan signal lines.

19. The electronic device of claim 18, wherein the first pixel further comprises:

a fifth transistor connected between the second node and the third transistor, and including a control terminal connected to a corresponding compensation signal line among a plurality of compensation signal lines; and a sixth transistor connected between the first transistor and the third transistor, and including a control terminal connected to the corresponding compensation signal line.

20. The electronic device of claim 18, wherein the first pixel further comprises:

a fifth transistor connected between a first terminal of the light emitting element and a second initialization voltage line which transmits a second initialization voltage, and including a control terminal connected to the second initialization signal line.

* * * * *